United States Patent
Obayashi et al.

(10) Patent No.: US 6,861,110 B2
(45) Date of Patent: Mar. 1, 2005

(54) INK-JET RECORDING SHEET

(75) Inventors: Keiji Obayashi, Hachinoji (JP); Osamu Hatano, Kokubunji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/351,942

(22) Filed: Jan. 27, 2003

(65) Prior Publication Data

US 2003/0175450 A1 Sep. 18, 2003

(30) Foreign Application Priority Data

Feb. 12, 2002 (JP) .......................................... 2002-033874

(51) Int. Cl.[7] .............................................. B41M 5/40
(52) U.S. Cl. ............................... 428/32.17; 428/32.19; 428/32.2; 428/32.21; 428/32.33; 428/32.34
(58) Field of Search ........................... 428/32.17, 32.19, 428/32.2, 32.21, 32.33, 32.34

(56) References Cited

U.S. PATENT DOCUMENTS 6,682,788 B2 * 1/2004 Saito et al. .............. 428/32.34

* cited by examiner

*Primary Examiner*—B. Shewareged
(74) *Attorney, Agent, or Firm*—Frishauf, Holtz, Goodman & Chick, P.C.

(57) ABSTRACT

An ink-jet recording sheet comprising a reflective support having thereon a porous ink absorbing layer containing a dye or a pigment, wherein a color difference $\Delta abL$ defined by the following formula is not more than 7:

$$\Delta abL = [(a_1-a_2)^2 + (b_1-b_2)^2 + (L_1-L_2)^2]^{1/2}$$

wherein $(L_1, a_1, b_1)$ and $(L_2, a_2, b_2)$ each are a set of coordinates $(L^*, a^*, b^*)$ defined in a CIELAB color space and measured on a surface of the reflective support adjacent to the ink absorbing layer and on an outermost surface of the ink absorbing layer respectively, and $a_2$ is in a range of $-2$ to 2 and $b_2$ is in a range of $-4$ to 4.

8 Claims, 1 Drawing Sheet

INK-JET RECORDING SHEET

FIELD OF THE INVENTION

The present invention relates to an ink-jet recording sheet which comprises a support having thereon a colored porous ink absorbing layer, and in particular to a recording sheet which exhibits excellent tone stability on a white background.

BACKGROUND OF THE INVENTION

In recent years, due to rapid technical innovations of ink-jet recording, the resulting print quality is approaching that of silver halide photography. Print quality achieved by ink-jet recording depends mainly on three elements consisting of a printer, an ink and a recording sheet. From the viewpoint of the image quality, the former two elements are subjected to recent marked technical innovations. Accordingly, difference in performance of ink-jet recording sheets (hereinafter occasionally referred to simply as recording sheets) has been considered to critically affect final print quality.

In order to prepare print quality approaching that of silver halide photography, utilizing ink-jet printing, recording sheets have been improved in various aspects. Specifically, recording sheets, which comprise a reflective support prepared by covering both sides of paper as a support with polyolefin resins such as polyethylene, having thereon an ink absorbing layer, have been widely employed to produce prints due to the following reasons. The cost is relatively low compared to plastic film and high grade quality prints approaching those of silver halide photography are produced which exhibit a feeling of depth, flexibility, smoothness, and glossiness.

Ink-jet recording sheets are divided into two main types, that is, one which is ink-absorptive like paper and the other which comprises a support having thereon an ink absorbing layer. Incidentally, the former has not been capable of producing high grade prints due to the fact that since ink penetrates directly into the support, it is difficult to achieve high maximum density and since the support itself absorbs ink solvents, marked image-shaped wrinkling results. Further, known are a number of types of ink-jet recording sheets which comprise a support having thereon an ink absorbing layer. However, problems occur in which when the support absorbs ink solvents, wrinkling tends to occur, and during storage, density tends to decrease due to gradual penetration of dyes adhered into the ink absorbing layer.

Contrary to this, ink-jet recordings sheets, which comprise a so-called non-water absorptive support which does not absorb ink at all, having thereon an ink absorbing layer, exhibit advantages such that aforesaid problems do not occur and it is possible to produce ink-jet prints with a feel of high grade.

Known as ink absorbing layers provided on a support, are two main types, a swelling type ink absorbing layer and a void type or a porous ink absorbing layer.

The swelling type ink absorbing layer is comprised mainly of hydrophilic polymers such as gelatin, polyvinyl alcohol, polyvinylpyrrolidone, and polyethylene oxide.

The void type (or porous) ink absorbing layer is prepared employing several production methods. The representative layer comprises a small amount of hydrophilic polymers and a large amount of minute particles. Voids are formed among the minute particles, into which water is absorbed. This type is also called a porous layer.

Listed as features of the swelling type ink absorbing layer are achievement of high glossiness, absorption of a large amount of ink due to use of swellable polymers within the swellable range, and low cost production. On the other hand, along with in an increase in recent ink-jet recording rate, various problems occur in terms of image quality.

On the other hand, listed as features of the void type ink absorbing layer are high ink absorption rate, minimized non-uniformity during printing, apparent surface dryness immediately after printing, and simultaneous compatibility between the water resistance and the ink absorption rate.

At present, both are employed depending on selection by operators. However, from the viewpoint of image quality, it is preferable to have the void type ink absorbing layer due to its higher ink absorption and faster ink drying.

Incidentally, in recent years, it has been attempted to prepare printed matter and printing proofs employing ink-jet recording. In such cases, it is necessary to not only achieve approaching the tone of finished images to that of printed matter but also to match the tone of the white background to the specified tone. In such cases, required as the tone of white backgrounds are various types depending on surface quality, personal taste, intended use, and localities. Employed as a means to adjust the white background to the desired tone are methods in which supports, as well as ink absorbing layers, are slightly tinted with colorants such as dyes or pigments.

When the white background tone of the surface of the ink absorbing layer is varied to several levels, the difference in coloring of the support is not always identically obtained in the ink absorbing layer, and depends on the type of the ink absorbing layer. As a result, in the support coloring method, complicated white background control is required.

On the other hand, it is relatively easy to adjust the tone of the white background on the ink receptive layer. Accordingly, that is preferable since it is possible to obtain ink-jet recording sheets having various white backgrounds while employing a single support. The white background of the ink receptive layer is generally adjusted by incorporating a very small amount of dyes and pigments.

Incidentally, as noted above, in recent years, along with realization of high speed ink-jet printing, recording sheets comprising a porous ink receptive layer have been e mainly mployed. In such cases, as the porous ink receptive layer is employed, it has been found that problems tend to occur in which the tone varies during storage.

Namely, when the ink absorbing layer is porous, coloring components in the white background portion are subjected to greater change compared to the cases in which the ink receptive layer is comprised of a swelling layer. As a result, differing white background tone occasionally results during storage. Particularly, when a plurality of sheets is stored while stacked, it often occurs that edge portions are subjected to discoloration or the uppermost sheet is subjected to discoloration during storage. Considered as one of the causes is the following. Since the ink absorbing layer is comprised of a porous layer, it tends to react with oxidizing materials such as oxygen, whereby colorants such as dyes are relatively easily decomposed.

Claim 1 of Japanese Patent Publication No. 3012580 describes an ink-jet recording sheet which comprises a support having thereon an ink receptive layer and in which $L^*$, $a^*$, and $b^*$, representing tone of the white background portion, which are measured based on JIS Z 8722 and specified by JIS Z 8730 are $L^* \geq 87$, $a^* = -2$ to $2$, and $b^* = -3$ to $3$, respectively.

JIS Z 8722 is a Japanese Industrial Standard, and conforms with ISO/DIS 7724; Paints and varnishes, published in 1997.

JIS Z 8730 is a Japanese Industrial Standard, and conforms with the method for specification provided in clause 4 of Publication CIE No. 15.2(1986) COLORIMETRY, SECOND EDITION revised in 1986 by Commission International de l'Eclairage—CIE in short.

A set of coordinates (L*, a*, b*) can be obtained using a L*a*b* color system, which is termed the CIE1976(L*a*b*) and is abbreviated as CIELAB.

Further, claim 2 of the aforesaid patent publication also describes an ink-jet recording sheet which comprises a support having thereon an ink receptive layer, in which the whiteness of the white background portion of the support has L*≧87, a*=−2 to 2, and b*=−5 to 0, respectively.

According to claim 1 of the aforesaid patent publication, even in the case of employing a support having any tone, when L*, a*, and b* of the ink receptive layer surface are adjusted to the aforesaid range, the preferred white background is obtained.

Further, according to claim 2 of the aforesaid patent publication, when the support, having L*, a*, and b* in the aforesaid range, is used, preferred whiteness of the ink receptive layer surface is achieved even though the ink receptive layer, having an optional degree of coloration is coated and the ink receptive layer surface exhibits white background characteristics having optional values of L*, a*, and b*.

SUMMARY OF THE INVENTION

From the viewpoint of the foregoing, the present invention was achieved. A first object of the present invention is to provide an ink-jet recording sheet in which the whiteness of the white background exhibits the preferred white tone, and variation of whiteness of the white background is minimized during extended storage, even though a porous ink absorbing layer is provided.

Further, a second object of the present invention is to provide an ink-jet recording sheet which has a white background particularly suitable for printing sheets and printing proofs employed for ink-jet printing, and is subject to minimal discoloration of the white background during extended storage.

According to investigations performed by the inventors of the present invention, it was discovered that when the ink absorbing layer was porous, the support was subjected to relatively high coloration, and a preferred white background was desired to obtain through coloration of the ink absorbing layer, the aforesaid problem, namely tone variation of white background during storage, tended to increase markedly.

It was also discovered that in order to achieve more preferred whiteness on the ink receptive layer surface, it was necessary to provide an ink absorbing layer which did not substantially vary the whiteness of the support. Further, when a porous ink absorbing layer having a large degree of coloration is provided on the ink receptive layer surface, as noted above, problems occur in which the white background portion of ink-jet recording sheets results in greater variation during storage.

The aforesaid objects of the present invention were achieved employing the embodiments described below.

1. An ink-jet recording sheet comprising a reflective support having thereon a porous ink absorbing layer comprising a dye or a pigment, wherein a color difference ΔabL defined by the following formula is not more than 7:

$$\Delta abL = [(a_1-a_2)^2 + (b_1-b_2)^2 + (L_1-L_2)^2]^{1/2}$$

wherein $(L_1, a_1, b_1)$ and $(L_2, a_2, b_2)$ each are a set of coordinates (L*, a*, b*) defined in a CIELAB color space and measured on a surface of the reflective support adjacent to the ink absorbing layer and on an outermost surface of the ink absorbing layer respectively, and $a_2$ is in a range of −2 to 2 and $b_2$ is in a range of −4 to 4.

2. The ink-jet recording sheet of item 1, wherein the outermost surface of the ink absorbing layer exhibits a 60 degree specular glossiness of 10 to 25% when measured using a method described in JIS-Z-8741.

JIS-Z-8741 is a Japanese Industrial Standard, and conforms with the following International Standards.

ISO 2813: 1994, Paints and varnishes

ISO 7668: 1986, Anodized aluminum and aluminum alloys

3. The ink-jet recording sheet of item 1, wherein the reflective support is a paper support coated with a polyolefin resin on both surfaces the paper support.

4. The ink-jet recording sheet of item 1,
   wherein the reflective support has a set of coordinates ($a_1$, $b_1$) defined in a CIELAB(a*, b*) space, $a_1$ being in a range of −4 to 4 and $b_1$ being in a range of −8 to 8.

5. The ink-jet recording sheet of item 3,
   wherein a surface of the coated polyolefin resin adjacent to the ink absorbing layer is an embossed surface.

6. The ink-jet recording sheet of item 5,
   wherein the reflective support has a surface roughness Ra of 0.6 to 5 μm.

7. The ink-jet recording sheet of item 5,
   wherein the reflective support has a set of coordinates ($a_1$, $b_1$) defined in a CIELAB(a*, b*) space, $a_1$ being from −4 to 4 and $b_1$ being from −8 to 8, and the reflective support has a surface roughness Ra of 0.6 to 5 μm.

DETAILED DESCRIPTION OF THE INVENTION

Figure 1:
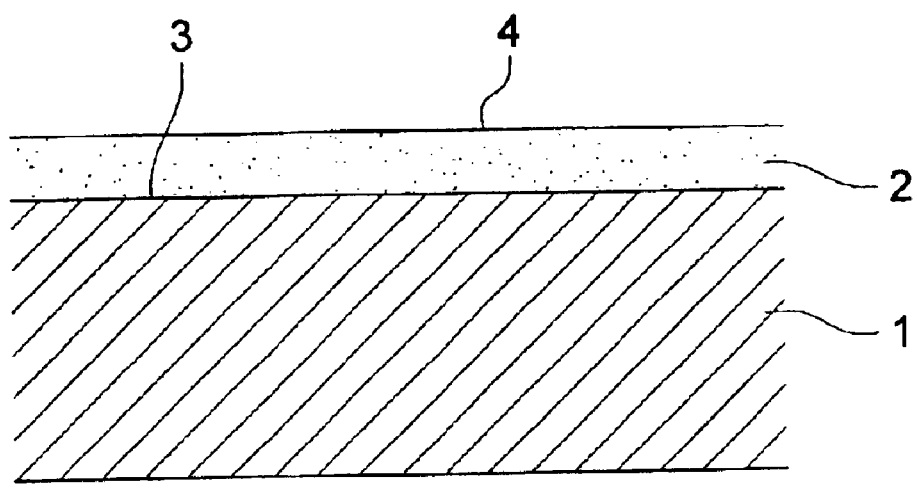
FIG. 1 shows a schematic diagram of an ink-jet recording sheet of the present invention.

The present invention will now be detailed.

The ink-jet recording sheet of the present invention comprises a reflective support having thereon an ink absorbing layer.

FIG. 1 can be used to understand the present invention. The numbers in the FIG. 1 indicate the following parts of the ink-jet recording sheet of the present invention.

1: a reflective support

2: an ink absorbing layer

3: a surface of the support adjacent to the ink absorbing layer.

4: an outermost surface of the ink absorbing layer

Employed as reflective supports used in the present invention may be either a water absorptive support or a non-water absorptive support. However, the non-water absorptive support is preferred because it is possible to obtain higher quality prints due to no formation of wrinkles.

Representative water absorptive supports include paper supports which are comprised mainly of natural pulp. A mixture of synthetic pulp and natural pulp may also be employed.

Listed as non-water absorptive supports are plastic resinous film supports as well as supports prepared by covering both sides of paper with plastic resinous film.

Listed as plastic resinous films are, for example, polyester film, polyvinyl chloride film, polypropylene film, cellulose triacetate film, and polystyrene film.

Supports which are particularly preferred in the present invention are reflective supports which are prepared by covering both sides of paper with plastic resins. Paper which is covered with plastic resins on both sides exhibits a feel almost like paper. Further, since the surface of paper is covered with plastic resins, discoloration of paper itself is minimized. As a result, effects of the present invention are exhibited markedly. Of these, the most preferred supports are those which are prepared by covering both sides of paper with polyolefin resins.

Supports prepared by covering both sides of paper with polyolefin resins, which are most preferably employed in the present invention, will now be described.

Paper employed for the supports according to the present invention is produced employing wood pulp as a main raw material, and if desired, employing synthetic pulp such as polypropylene, or synthetic fiber such as nylon or polyester. As wood pulp, for example, any of LBKP, LBSP, NBKP, NBSP, LDP, NDP, LUKP, and NUKP may be employed. However, LBKP, NBSP, LBSP, NDP, and LDP, having shorter fibers, in a larger proportion are preferably employed. However, the content proportion of LBSP or LDP is preferably from 10 to 70 percent by weight.

As the aforesaid pulp, chemical pulp (sulfate salt pulp and sulfite pulp) containing minimum impurities is preferably employed, and pulp, which has been subjected to a bleaching treatment to increase whiteness, is also beneficial.

Suitably incorporated into paper may be sizing agents such as higher fatty acids and alkylketene dimers; white pigments such as calcium carbonate, talc, and titanium oxide; paper strength enhancing agents such as starch, polyacrylamide, and polyvinyl alcohol; optical brightening agents; moisture maintaining agents such as polyethylene glycols; dispersing agents; and softeners such as quaternary ammonium.

The degree of water freeness of pulp employed for paper making is preferably from 200 to 500 ml according to CSF Specification. Further, the sum of weight percent of 24-mesh residue and weight percent of 42-mesh calculated portion regarding the fiber length after beating, specified in JIS P 8207, is preferably between 30 and 70 percent. Incidentally, the weight percent of 4-mesh residue is preferably no more than 20 percent by weight.

The basis weight of paper is preferably from 50 to 180 g, and is most preferably from 60 to 140 g. The thickness of paper is preferably from 50 to 180 $\mu$m.

During the paper making period or after the paper making period, paper may be subjected to a calendering treatment to achieve higher smoothness. The density of paper is commonly from 0.7 to 1.2 g/cm$^3$ (JIS P 8118). Further, the stiffness of paper is preferably from 20 to 300 g under the conditions specified in JIS P 8143.

Surface sizing agents may be applied onto the paper surface. Employed as said surface sizing agents may be the same as those mentioned above, capable of being incorporated into the aforesaid paper.

The pH of paper, when determined employing the hot water extraction method specified in JIS P 8113, is preferably from 5 to 9.

Polyolefin resins will now be described which are employed to cover both sides of paper.

Preferably employed as polyolefin resins, which achieve the purposes of the present invention, include polyolefins such as polyethylene, polypropylene, and polyisobutylene, and copolymers comprised of ethylene and propylene as the major component. Of these, polyethylene is particularly preferred.

Particularly preferred polyethylene will now be described.

Polyethylene which covers both surfaces of paper, is mainly low density polyethylene (LDPE) and/or high density polyethylene (HDPE), but it is also acceptable to employ a combination of LLDPE and polypropylene.

Specifically, employed as a polyolefin layer on the ink absorbing layer side may one which has improved opacity and whiteness by incorporating rutile or anatase type titanium oxide in polyolefin resins. The content ratio of titanium oxide used herein is commonly from 0.1 to 20 percent by weight with respect to the polyolefin resin, and is preferably from 1 to 13 percent by weight.

In order to prepare recording sheets of the present invention, it is preferable to add highly heat resistant pigments, and optical brightening agents to the polyolefin layer to adjust the whiteness.

Listed as coloring pigments are, for example, ultramarine blue, Prussian blue, cobalt blue, phthalocyanine blue, manganese blue, cerulean blue, tungsten blue, molybdenum blue, and anthraquinone blue.

Listed as optical brightening agents are, for example, dialkylaminocoumarin, bisdimethylaminostilbene, bismethylaminostilbene, 4-alkoxy-1,8-naphthalenedicarboxylic acid-N-alkylimide, bisbenzoxazolylethylene, and dialkylstilbene.

The amount of polyethylene employed on both sides of paper is selected so that curling is optimized under low and high humidity after providing a backing layer while taking into account the thickness of the ink absorbing layer. Commonly, the thickness of the polyethylene layer on the ink absorbing layer coating side is in the range of 5 to 40 $\mu$m, while the thickness of the polyethylene layer on the backing layer coating side is in the range of 10 to 30 $\mu$m.

Specifically, in the case of a paper-basis weight of 120 g or less, from the viewpoint of minimizing variation of curl due to humidity after providing a porous ink receptive layer, it is preferable that the thickness of the polyethylene layer on the ink receptive layer side is less than that on the opposite side.

Further, it is preferable that the aforesaid polyethylene coated paper exhibits the characteristics described below.
1. Tensile strength is preferably from 2 to 30 kg in the longitudinal direction and from 1 to 20 kg in the lateral direction, in terms of the strength specified in JIS P 8113.
2. Tear strength specified in TIS P 8116 is preferably from 10 to 200 g in the longitudinal direction and from 20 to 300 g in the lateral direction.
3. opacity is preferably at least 80 percent, and is most preferably at least 85 percent, which is measured employing the method specified in JIS P 8138.
4. Clark stiffness of the support is preferably from 50 to 300 cm$^2$/100 in the recording sheet transporting direction.
5. Moisture of base paper is preferably from 4 to 10 percent by weight with respect to the core paper.

With regard to the surface glossiness of the ink-jet recording sheet of the present invention, the surface may be so-called glossy. Further, the surface opposite the ink absorbing layer side may have texture such as fine-grained regular or irregular shaped unevenness, a matte surface, or a semi-matte surface. The recording sheet exhibiting the unevenness, as described herein, refers to a recording sheet which has a surface roughness of a center line mean roughness (Ra) of 0.5 to 3.0 μm, when measured employing a standard length of 2.5 mm and a cut-off value 0.8 mm specified in JIS B 0601.

Various textures, as described above, are obtained in such a manner that matting agents are added to the ink receptive layer surface; after forming an ink receptive layer, the resulting surface is subjected to embossing, or an ink absorbing layer is provided on a support which has been subjected to surface embossing.

When the ink absorbing layer is subjected to embossing, embossing on the surface tends to disappear after ink-jet printing. Therefore, it is preferable to employ a support which has been subjected to embossing or to employ matting agents on the ink absorbing layer. Specifically, when ink-jet recording sheets having a matte surface or semi-matte surface are prepared, it is preferable to combine an ink absorbing layer comprising a matting agent with a support which has been subjected to embossing.

In the case of the particularly preferred support which is prepared by covering both sides of paper with polyolefin resins, it is preferable that the polyolefin resin surface is subjected to embossing after covering the paper with the polyolefin resins.

A representative method, in which the polyolefin resin surface is previously subjected to embossing to form unevenness, is as follows. After polyolefin resins are applied onto the base paper employing melt-extrusion, the resulting coating is brought into pressure contact with an embossing roller so as to result in a minute unevenness pattern. Methods which perform the pattern embossing include a method in which the resin coated paper, which is prepared by melt extrusion, is subjected to an embossing calender treatment at approximately room temperature, and a method in which when polyolefin resins are subjected to extrusion coating, unevenness is formed employing a cooling roller of which surface is curved with a pattern, while being cooled. However, the latter is preferred because it is possible to carry out embossing under relatively low pressure, and in addition, it is possible to carry out embossing more accurately and uniformly.

The preferable method, which varies the shape of the unevenness on the support surface is that the aforesaid cooling roller is employed which has different size, shape, or height of the unevenness.

The unevenness relationship between the support surface and the ink absorbing layer surface depends on the characteristics of the ink absorbing layer. However, when the ink absorbing layer has a high ink absorption rate and is a porous layer comprised of voids capable of producing high quality prints, the difference between the uppermost of the unevenness of the support surface and the bottommost thereof tends to decrease markedly due to an increase in the dried coating thickness.

In the case of an ink-jet recording sheet which is prepared by applying an ink absorbing layer onto a support on which surface unevenness has been provided, it is preferable that the surface roughness of the support is more than the difference between the uppermost of the desired unevenness of the ink absorbing layer and the bottommost thereof. As a result, it is preferable to employ a support which has a surface roughness Ra of 0.6 to 5 μm.

Whiteness of the ink-jet recording sheets of the present invention will now be described.

Generally, the preferred whiteness of ink-jet recording sheets is determined depending on their use and preference in the same manner as the whiteness of common sheets. Whiteness of printing paper sheets is determined employing the method specified in JIS Z 8722, and whiteness is generally desired to be a* and b*, represented by JIS Z 8730, from −2 to 2 and from −4 to 4, respectively. On the other hand, in the case of photographic use, it appears that the whiteness represented by the smaller value of b*, such as −10 to 0, is accepted as the preferred whiteness.

As mentioned above, it is possible to obtain the aforesaid whiteness by providing an ink absorbing layer comprising a small amount of coloring dyes or coloring pigments on the reflective support. However, in the ink-jet recording sheets of the present invention, it is necessary to provide a slightly colored ink absorbing layer so that difference ΔabL between the whiteness of support surface on the ink absorbing layer coating surface side and the whiteness of the support surface is less than or equal to 7.

When ΔabL exceeds 7, discoloration of ink-jet recording sheets increases. Therefore, ΔabL is preferably less than or equal to 5.

As mentioned above, when sheets are used for printing, white tone of the ink absorbing layer surface is desired in which a* and b* are from −2 to 2 and from −4 to 4, respectively. In order to realize such white tone, it is preferred to use a support in which a* and b*, as whiteness for a reflective support, are from −4 to 4 and from −8 to 8, respectively.

Further, lightness index L* of the recording sheet surface is preferably at least 88, and is more preferably at least 89. In order to realize such lightness index, L* of the reflective support is at least 85, and is preferably at least 88.

It is possible to carry out slight coloration of the ink absorbing layer by incorporating various dyes or pigments, known in the art, in the ink absorbing layer. The dyes may be either water-soluble dyes or oil-soluble dyes. Employed as water-soluble dyes may be either anionic dyes or cationic dyes.

Either water-soluble dyes or oil-soluble dyes may be added directly to ink absorbing layer forming coating compositions or a dye solution may be over-coated after forming the ink absorbing layer. Further, a method is preferably employed in which oil-soluble dyes are subjected to emulsion dispersion together with other oil and added to a coating composition. Still further, pigments are subjected to minute dispersion employing homogenizers, known in the art, such as a ball mill and a sand mill, and the resulting dispersion is added to a coating composition and then used. In such a case, it is preferable that dispersion is cared out so that the resulting average particle diameter is from about 0.05 to about 0.1 μm. In the case of pigments, image color tends to vary due to variation of covering power depending on the diameter of pigment particles. Therefore, it is preferable to use particles having a narrow particle size distribution. Colorants are preferably either water-soluble or oil-soluble dyes.

Incidentally, when used for printing, it is preferable that so-called optical brightening agents are not used in the ink absorbing layer. When the optical brightening agents are used, white tone tends to visually vary markedly due to viewing conditions (especially, difference in the content ratio of ultraviolet radiation).

The added amount of the aforesaid dyes and pigments widely differs depending on their types, but is preferably in the range of 0.01 to 200 mg per $m^2$ of the recording sheet.

These dyes and pigments may be employed in combination of at least two types.

Incidentally, in the present invention, white tone of the surface of the support opposite the surface, on which the ink absorbing layer is provided, is not particularly limited from the viewpoint of the present invention. From the viewpoint of differentiating between the front and the rear of the support, a large difference in whiteness between the front and the rear may result (for example, ΔabL>20). In the present invention, however, it is unnecessary to satisfy such conditions.

Ink-jet recording sheets of the present invention are particularly suitable for printing and proofs, and those having any glossiness may be employed. However, relatively low glossiness is preferred. Glossiness at 60 degrees, specified in JIS Z 8741, is preferably from 10 to 25 percent.

In order to obtain such glossiness, it is preferable that supports, which carry unevenness on the surface as noted above, are employed and the ink absorbing layer comprises matting agents. In such a manner, it is possible to minimize the decrease in color density during ink-jet printing and to result in an appropriate decrease in glossiness The average particle diameter of an individually used matting agent is commonly from 1 to 30 μm, and is preferably from about 2 to about 20 μm. Further, a matting agent which is subjected to monodispersion is more preferred. A matting agent particle size distribution is measured, and the degree of dispersion is obtained by dividing the standard deviation by the average particle diameter. The resulting degree of dispersion is commonly less than or equal to 2, and is preferably less than or equal to 0.5.

An ink absorbing layer provided on a support will now be described.

The ink absorbing layer may be provided only on one side of the support or may be provided on both sides. In such a case, ink absorbing layers provided on both sides may be the same or different.

The ink absorbing layer of the ink-jet recording sheet of the present invention is a porous ink absorbing layer comprised of voids which exhibit a high ink absorption rate.

The aforesaid void type ink absorbing layer is preferably comprised of a porous layer comprised of a void layer which comprises minute inorganic particles and a small amount of hydrophilic polymers.

Listed as such minute inorganic particles may be white inorganic pigments such as precipitated calcium carbonate, heavy calcium carbonate, magnesium carbonate, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, synthetic non-crystalline silica, colloidal silica, alumina, colloidal alumina, and pseudo-boehmite, aluminum hydroxide, lithopone, zeolite, and magnesium hydroxide.

Employed as such minute inorganic particles may be primary particles thereof without any modification or those which are in the secondary coagulated particle formation state.

In the present invention, particularly from the viewpoint capable of forming minute voids, either silica or pseudo-boehmite is preferred. Of these, silica which is synthesized employing a gas phase method, colloidal silica and pseudo-boehmite are particularly preferred. Further, of these, silica having an average particle diameter of at most 100 nm, which is synthesized employing a gas phase method, is most preferred due to the higher coloration rate, the formation of a high void ratio as well as the ease of coexistence with cationic polymers which enhance fixing properties of dyes during ink-jet printing.

The average diameter of minute inorganic particles is obtained as a simple average (a number average) in such a manner that 100 particles are randomly selected and the particle themselves or the cross-section or the surface of the void layer is observed employing an electron microscope. Herein, each particle diameter is represented by the diameter of a circle which has the same area as the projection area of each particle.

Listed as hydrophilic polymers employed in the void layer are, for example, gelatin (such as alkali process gelatin, acid process gelatin, and gelatin derivatives in which amino groups are sealed with phenyl isocyanate or phthalic anhydride), polyvinyl alcohols (preferably having an average degree of polymerization of 300 to 4000, and a ratio of saponificatin of 80.0 to 99.5 percent), polyvinylpyrrolidone, polyethylene oxides, hydroxylethyl cellulose, polyacrylamide, agar, Pullulan, dextran, acrylic acid, carboxymethyl cellulose, casein, and alginic acid. At least two of these types may be employed in combination. Those which are preferred in the present invention are polyvinyl alcohols.

Polyvinyl alcohols, which are preferably employed in the present invention, include common polyvinyl alcohol which is prepared by hydrolyzing polyvinyl acetate, and in addition, polyvinyl alcohol in which the end terminal is subjected to cationic modification and anion-modified polyvinyl alcohol having an anionic group.

Polyvinyl alcohol, which is prepared by hydrolyzing vinyl acetate, is preferably employed when its average degree of polymerization is at least 300. Particularly, the polyvinyl alcohol having an average degree of polymerization of 1,000 to 5,000 is preferably employed. The ratio of saponification is preferably from 70 to 100 percent, and is more preferably from 80 to 99.5 percent.

Further, when the aforesaid void layer comprises polyvinyl alcohol as a hydrophilic polymer, in order to improve the layer forming properties and to enhance the layer strength, boric acids or salts thereof may be incorporated.

Boric acids or salts thereof refer to oxygen acids having a boron atom as the central atom and salts thereof, and specifically include orthoboric acid, metaboric acid, hypoboric acid, tetraboric acid, and pentaboric acid, and salts thereof.

The used amount of boric acids or salts thereof may vary widely depending on the amount of minute inorganic particles and hydrophilic polymers of a coating composition, but is commonly from 1 to 60 percent by weight with respect to the hydrophilic polymers, and is preferably from 5 to 40 percent by weight.

Further, other than the aforesaid boric acid based hardeners, or in combination with boric acid salts, it is possible to use organic hardeners such as epoxy based hardeners, aldehyde based hardeners, isocyanate based hardeners, ethyleneimino based hardeners, and melamine based hardeners.

In the present invention, an ink absorbing layer is comprised of a porous layer comprising voids due to the high ink absorption rate, the minimal non-uniformity of images, and the relatively low curl tendency due to the relatively low amount of used hydrophilic polymers.

Other than the compounds described above, it is possible to add various types of additives to the ink absorbing layer of the ink-jet recording sheet of the present invention. Of these, cationic mordants are preferably employed to improve water fastness as well as moisture resistance after printing.

Employed as cationic mordants are polymer mordants having a primary, secondary, or tertiary amino group, or a quaternary ammonium salt group. Of these, polymer mordants having a quaternary ammonium salt group are preferred due to minimal discoloration and minimal degradation of lightfastness during storage and sufficient high dye mordant capability.

Preferred polymer mordants are obtained as homopolymers of monomers having the aforesaid quaternary ammonium salt group, and copolymers or condensation polymers with other monomers.

Other than the aforesaid additives, it is possible to incorporate various additives known in the art, which include, for example, UV absorbers described in Japanese Patent Application Open to Public Inspection Nos. 57-74193, 57-87988, and 62-261476, anti-discoloring agents described in Japanese Patent Application Open to Public Inspection Nos. 57-74192, 57-87989, 60-72785, 61-146591, 1-95091, and 3-13376, various anionic, cationic, and non-ionic surface active agents, optical brightening agents described in Japanese Patent Application Open to Public Inspection Nos. 59-42993, 59-52689, 62-280069, 61-242871, and 4-219266, anti-foaming agents, lubricants such as diethylene glycol, antiseptic agents, thickening agents, antistatic agents, and matting agents.

Prior to applying the ink absorbing layer onto a support, for the purpose of increasing the adhesion strength between the support surface and the coating layer, it is preferable that the support is subjected to a corona discharge treatment or a subbing treatment. In the sublayer, hydrophilic polymers, which are employed in the aforesaid ink absorbing layer, and various latexes, or combinations thereof are employed. The thickness of the sublayer is commonly from 0.0 to 0.5 $\mu$m.

In order to minimize curling, and sticking as well as ink transfer during sheet stacking immediately after printing, it is possible to provide various back layers on the side-opposite the ink absorbing layer of the ink-jet recording sheet of the present invention.

Components of the back layer vary depending on the type and thickness of supports, as well as on the components and thickness of the front side, but commonly hydrophilic binders and hydrophobic binders are employed. The thickness of the back layer is commonly in the range of 0.1 to 10 $\mu$m.

Further, in order to minimize sticking to other recording sheets, improve writability, and transportability in the ink-jet recording apparatus, it is preferable that the surface of the back layer is roughened. For roughening the surface, minute organic or inorganic particles having a diameter of 2 to 20 $\mu$m are preferably employed. The aforesaid back layer may be provided in advance, or provided after applying coating compositions according to the present invention.

Surface smoothness of the back layer preferably exhibits parameters such as Ra=0.4 to 5.0 $\mu$m, Rz=1 to 30 $\mu$m, and Rmax=2 to 40 $\mu$m, and glossiness is preferably from 5 to 30 percent.

The ink absorbing layer is applied onto a support employing coating methods such as a roll coating method, a rod bar coating method, an air knife coating method, a spray coating method, a curtain coating method, or preferably employing an extrusion coating method using a hopper, described in U.S. Pat. No. 2,681,294.

When polyolefin resin coated paper is employed as a support, drying is preferably carried out in the range of about 0 to about 80° C. When exceeding 80° C., polyolefin resins are softened, whereby transportability is occasionally degraded and glossiness of the recording layer surface occasionally results in non-uniform. Drying temperature ranges preferably from 0 to 70° C.

Further, it is preferable that the ink absorbing layer surface according to the present invention exhibits the following characteristics.

1. Bekk smoothness: 200 to 2,000 seconds (on the ink absorptive side) and 50 to 1,000 seconds (on the back layer side)
2. Friction coefficient: front and rear dynamic friction coefficient is from 0.2 to 1.0.
3. Opacity: 88 to 98 percent The ink-jet recording sheet of the present invention is preferably employed for water based dye ink and water based pigment ink. Further, it is possible to apply it to oil based pigment ink.

EXAMPLES

The present invention will now be specifically described with reference to examples. However, the embodiments of the present invention is not limited to these examples. Incidentally, "percent" in the examples is absolute dry percent by weight.

Example 1

<<Preparation of Ink-jet Recording Sheet>>
(Preparation of Supports)
(Preparation of Support A)

Low density polyethylene, having a density of 0.92, was applied onto the rear surface of photographic base paper having a moisture content of 5 percent by weight and a basis weight of 90 g/m$^2$, so as to achieve a thickness of 15 $\mu$m, employing a melt extrusion coating method. Subsequently, low density polyethylene, having a density of 0.92, was applied onto the front surface so as to achieve a thickness of 15 $\mu$m, employing a melt extrusion coating method. Thus a support, which is covered with polyethylene on both sides and has an embossed surface, was prepared.

Subsequently, the front side of the resulting support was subjected to corona discharge, and polyvinyl alcohol sublayer comprising hardeners was provided so as to result in a coated weight of 0.03 g/m$^2$. Thereafter, the rear side was also subjected to a corona discharge and a latex layer, comprised of silica particles having an average diameter of approximately 1 $\mu$m as a matting agent, was provided to result in a coated weight of 0.2 g/m$^2$. Thus Support A was prepared.

White background characteristics of the surface of the ink absorbing layer coating side of Support A prepared as above were L*=92.3, a*=+1.34, and b* 6.17, while surface roughness Ra was 2.29 $\mu$m.

Further, white background characteristics of the rear surface were L*=91.2, at =1.24, and b*=+2.6, while surface roughness Ra was 1.54 $\mu$m. Incidentally, Bekk smoothness and 60-degree glossiness of the front surface were 800 seconds and 12 percent, respectively, while those of the rear surface were 450 seconds and 12 percent, respectively.

(Preparation of Support B)

Support B was prepared in the same manner as aforesaid Support A, except that anatase type titanium oxide was incorporated in polyethylene on the front surface in an amount of 5 percent with respect to polyethylene. Whiteness of the ink absorbing layer coating side of Support B was L*=95.5, a*=0.72, and b*=+0.60.

(Preparation of Supports C and D)

In the preparation of aforesaid Support B, colorant pigment was suitably incorporated in polyethylene on the front surface. Thus Support C was prepared which exhibited characteristics of L*=94.4, a*=-0.26, and b*=-4.21, and Support D was also prepared which exhibited characteristics of L*=93.9, a*=-0.90, and b*=-7.80.

(Ink Absorbing Layer Coating)

An ink absorbing layer coating composition, which was applied to the front surface of each support, was prepared as described below.

(Preparation of Dispersion)
<Preparation of Titanium Oxide Dispersion 1>

Added to 90 L of a pH 7.5 aqueous solution comprising 150 g of sodium tripolyphosphate, 500 g of polyvinyl alcohol (PVA235, manufactured by Kuraray Co., Ltd.), 150 g of cationic polymer (P-1), and 10 g of an antifoaming agent (3N381, manufactured by Sun Nobco Ltd.) was 20 kg of titanium oxide (CR-50, surface alumina treated product, manufactured by Ishihara Sangyo Kaisha, Ltd.), and the resulting mixture was dispersed, employing a high pressure homogenizer (manufactured by Sanwa Kogyo Co., Ltd.). Thereafter, the total volume was adjusted to 100 L, whereby uniform Titanium Oxide Dispersion 1 was obtained.

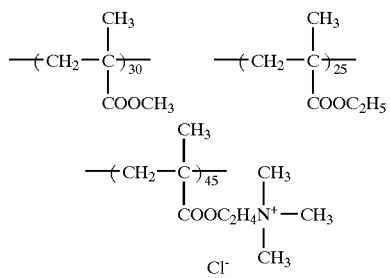

Mn = 13,000

<Preparation of Silica Dispersion 1>

After suction dispersing 125 kg of gas phase method silica, having an average diameter of primary particles of approximately 0.014 μm and a BET surface area of 220 m²/g, in 600 L of pure water of which pH had been adjusted to 2.5 by adding nitric acid, the total volume was adjusted to 660 L by adding pure water, whereby Silica Dispersion 1 was obtained.

<Preparation of Silica Dispersion 2>

While stirring, 66.0 L of Silica Dispersion 1, prepared as above, was added to 15 L of an aqueous solution (having a pH of 2.3) comprising 1.29 kg of cationic polymer (p-1), 5.0 L of ethanol, and 1.5 L of n-propanol. Subsequently, 6.0 L of an aqueous solution comprising 240 g of boric acid and 210 g of borax was added, and 1 g of aforesaid antifoaming agent SN381 was subsequently added.

The resulting mixture was dispersed employing the aforesaid high pressure homogenizer and the total volume was adjusted to 90 L by adding pure water, whereby Silica Dispersion 2 was prepared.

<Preparation of Silica Dispersion 3>

While stirring, 66.0 L of aforesaid Silica Dispersion 1 was added to 15 L of an aqueous solution (having a pH of 2.3) comprising 1.29 kg of cationic polymer (p-2) and 5.0 L of ethanol. Subsequently, 6.0 L of an aqueous solution comprising 240 g of boric acid and 210 g of borax was added, and 1 g of aforesaid antifoaming agent SN381 was then added.

The resulting mixture was dispersed employing the aforesaid high pressure homogenizer and the total volume was adjusted to 90 L by adding pure water, whereby Silica Dispersion 3 was prepared.

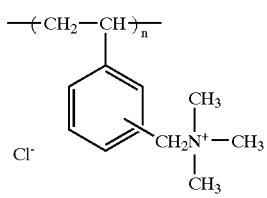

Mn = 24,000

<Preparation of Emulsified Dispersion 1>

Dissolved in 12 L of ethyl acetate was 3,000 g of diisodecyl phthalate. The resulting solution was added to 35 L of an aqueous solution comprising 3,500 g of acid process gelatin, cationic polymer (P-1), and 4,000 ml of a 50 percent aqueous saponin solution, and then mixed. Subsequently the resulting mixture was emulsified employing the aforesaid high pressure homogenizer. Thereafter, after removing ethyl acetate under reduced pressure, the total volume was adjusted to 50 L, whereby Emulsified Dispersion 1 was prepared.

Added to 7 L of pure water comprising 3 g of PVA235 were 156 g of methacrylic acid ester based monodispersed matting agent MX-1500, manufactured by Sohken Kagaku Co., Ltd. and 30 g of methacrylic acid ester based monodispersed matting agent MR7G (having an average particle diameter of approximately 5 μm), manufactured by the same. The resulting mixture was dispersed employing a high speed homogenizer, and the total volume was adjusted to 7.8 L, whereby Matting Agent Dispersion 1 was prepared.

(Preparation of Ink Absorbing Layer Coating Composition)

Based on the procedures described below, each coating composition of a first layer, second layer, third layer, and fourth layer for the ink absorbing layer was prepared.

<First Layer Coating Composition>

While stirring 560 ml of aforesaid Silica Dispersion 2 prepared as above at 40° C., each additive described below was successively added.

| | |
|---|---|
| 1: 10 percent aqueous polyvinyl alcohol (PVA203, manufactured by Kuraray Kogyo Co., Ltd.) | 6 ml |
| 2: 5 percent aqueous polyvinyl alcohol (PVA235, manufactured by Kuraray Kogyo Co., Ltd.) | 170 ml |
| 3: 5 percent aqueous polyvinyl alcohol (PVA245, manufactured by Kuraray Kogyo Co., Ltd.) | 120 ml |
| 4: Emulsified Dispersion 1 | 22 ml |
| 5: Titanium Oxide Dispersion 1 | 40 ml |
| 6: Latex Emulsion AE-803, manufactured by Daiichi Kogyo Co., Ltd. | 24 ml |
| 7: Pure water to make | 1000 ml |

<Second Layer Coating Composition>

While stirring 560 ml of Silica Dispersion 2 prepared as above at 40° C., each additive described below was successively added.

| | |
|---|---|
| 1: 10 percent aqueous polyvinyl alcohol (PVA203, manufactured by Kuraray Kogyo Co., Ltd.) | 0.6 ml |
| 2: 5 percent aqueous polyvinyl alcohol (PVA235, manufactured by Kuraray Kogyo Co., Ltd.) | 150 ml |
| 3: 5 percent aqueous polyvinyl alcohol (PVA245, manufactured by Kuraray Kogyo Co., Ltd.) | 120 ml |
| 4: Emulsified Dispersion 1 | 30 ml |
| 5: Kayafix M (manufactured by Nippon Kayaku Co., Ltd.) | 12 ml |
| 6: Pure water to make | 1000 ml |

<Third Layer Coating Composition>

While stirring 560 ml of Silica Dispersion 3 prepared as above at 40 *C, each additive described below was successively added.

| | |
|---|---|
| 1: 10 percent aqueous polyvinyl alcohol (PVA203, manufactured by Kuraray Kogyo Co., Ltd.) | 6 ml |
| 2: 5 percent aqueous polyvinyl alcohol (PVA235, manufactured by Kuraray Kogyo Co., Ltd.) | 260 ml |
| 3: Emulsified Dispersion 1 | 30 ml |
| 4: Kayafix M (manufactured by Nippon Kayaku Co., Ltd.) | 6 ml |

-continued

| | |
|---|---|
| 5: Pure water to make | 1000 ml |
| 6: zirconyl acetate (30 percent aqueous solution) | 12 ml |

Incidentally, 6: was added to the third layer coating composition just prior to coating, employing an in-line mixer.

<Fourth Layer Coating Composition>

While stirring 690 ml of aforesaid Silica Dispersion 3 prepared as above at 40° C., each additive described below was successively added.

| | |
|---|---|
| 1: 10 percent aqueous polyvinyl alcohol (PVA203, manufactured by Kuraray Kogyo Co., Ltd.) | 0.6 ml |
| 2: 5 percent aqueous polyvinyl alcohol (PVA235, manufactured by Kuraray Kogyo Co., Ltd.) | 220 ml |
| 3: Silicone dispersion (By-22-839, manufactured by Toray-Dow Corning Silicone Co., Ltd.) | 3.5 ml |
| 4: 50 percent aqueous saponin solution | 4 ml |
| 5: Matting Agent Dispersion 1 | 10 ml |
| 6: Surface Active Agent 1 (6 percent solution) | 4 ml |
| 7: Pure water to make | 1000 ml |

Polyvinyl alcohols employed to prepare each coating composition will now be detailed.

PVA235: saponification ratio of 88 percent and average degree of polymerization of 3,500

PVA245: saponification ratio of 88 percent and average degree of polymerization of 4,500

Surface Active Agent 1

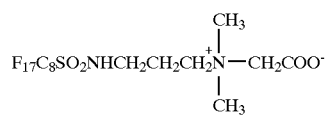

(Coating of Ink Absorbing Layer)

Each coating composition prepared as above was filtered employing filters described below.

First Layer and Second Layer: CPT10 manufactured by ToyoRoshi

Kaisha, Ltd., employed in two stages

Third Layer and Fourth Layer: CPT30 manufactured by ToyoRoshi

Kaisha, Ltd., employed in two stages

Subsequently, four layers were simultaneously applied onto each of aforesaid supports A through D covered with polyolefin on both sides in the following order: the first layer (40 μm), the second layer (50 μm), the third layer 850 μm), and the fourth layer (30 μm). The value in the parenthesis shows each wet coating thickness.

Each coating composition was coated at 40° C., employing a 4-layer type slide hopper and cooled for 20 seconds immediately after coating in an 8° C. cooling zone, and subsequently dried for 60 seconds employing a 20 to 30° C. airflow at a relative humidity of 5 to 30 percent, for 60 seconds employing a 55° C. airflow at a relative humidity of 5 to 20 percent, and for 60 seconds employing a 45° C. airflow at a relative humidity of 10 to 30 percent. Thereafter, the resulting coating was rehumidified at 23° C. and at a relative humidity of 40 to 60 percent, whereby Recording Sheets, A through D were obtained.

Subsequently, each of the aqueous dye solutions of yellow (Y1), magenta (M1) and cyan (C1) was overcoated onto each of aforesaid Recording Sheet A through D in the amount and combinations described in Table 1 and subsequently dried, whereby Recording Sheets 1A through 1D, 2A through 2D, 3A through 3d, and 4A through 4D were obtained, which exhibited background characteristics of the ink absorbing layer surface described in Table 1.

The surface glossiness of all the resulting recording sheets was from 15 to 17 percent.

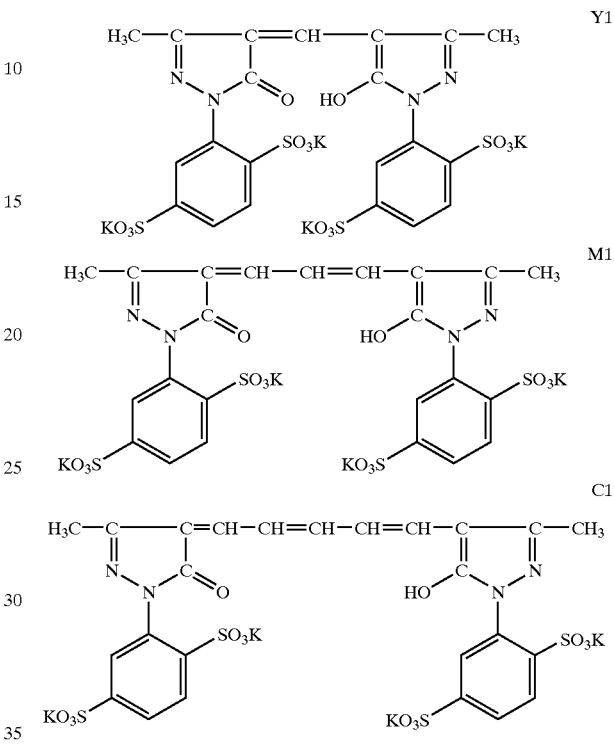

<<Evaluation of Ink-jet Recording Sheets>>

(Measurement of Whiteness of Support and Ink Absorbing Layer)

Measurements were performed employing the method described in JIS Z 8722 and values a*, b*, and L* were obtained based on the method specified in JIS Z 8730. Whiteness was then calculated based on the aforesaid formula (1). Incidentally, a densitometer (X-rite 938 of X-rite Co.) was employed and values a*, b*, and L* were obtained.

(Evaluation of White Background Tone)

The ink absorbing layer surface of each recording sheet was visually observed and the tone of the white background portion was evaluated based on the criteria described below.

A: excellent white background

B: pronounced bluish-white background

C: pronounced yellowish-white background (Evaluation of White Background Variation)

Twenty of each types of recording sheets were stacked and stored at 35° C. (without humidity control) for one week while unpackaged. Thereafter, the background of the center area of the uppermost recording sheet and the tenth recording sheet was visually observed. Subsequently, the tone variation of the white background of the uppermost recording sheet was evaluated based on the criteria described below.

A: almost impossible to identify any difference in the variation of white background B: tone varied toward bluish C: tone markedly varied toward yellowish Table 1 shows the obtained results.

TABLE 1

| Recording Sheet No. | Support No. | Coloring Dye (mg/m²) | | | Support Whiteness | | | Ink Absorptive Layer Whiteness | | | Each Evaluation Result | | Remarks |
|---|---|---|---|---|---|---|---|---|---|---|---|---|---|
| | | Y1 | M1 | C1 | L* | a* | b* | L* | a* | b* | ΔabL | *1 | *2 | |
| 1A | A | 3.0 | 1.0 | — | 92.3 | +1.34 | +6.17 | 91.4 | +1.92 | +9.03 | 3.05 | C | A | Comp. |
| 1B | B | 3.0 | 1.0 | — | 95.5 | +0.72 | +0.60 | 94.0 | +1.22 | +3.32 | 3.15 | A | A | Inv. |
| 1C | C | 3.0 | 1.0 | — | 94.4 | −0.26 | −4.21 | 92.3 | +0.33 | −1.41 | 3.55 | A | A | Inv. |
| 1D | D | 3.0 | 1.0 | — | 93.9 | −0.90 | −7.80 | 91.7 | −0.29 | −5.48 | 3.26 | B | A | Comp. |
| 2A | A | 10.0 | 2.0 | — | 92.3 | +1.34 | +6.17 | 90.2 | +2.31 | +11.2 | 5.54 | C | B | Comp. |
| 2B | B | 10.0 | 2.0 | — | 95.5 | +0.72 | +0.60 | 93.5 | +1.90 | +5.62 | 5.53 | C | B | Comp. |
| 2C | C | 10.0 | 2.0 | — | 94.4 | −0.26 | −4.21 | 92.0 | +0.82 | +0.55 | 5.44 | A | B | Inv. |
| 2D | D | 10.0 | 2.0 | — | 93.9 | −0.90 | −7.80 | 91.5 | +0.27 | −3.16 | 5.35 | A | B | Inv. |
| 3A | A | — | 1.0 | 2.0 | 92.3 | +1.34 | +6.17 | 90.0 | +0.88 | +2.85 | 4.06 | A | A | Inv. |
| 3B | B | — | 1.0 | 2.0 | 95.5 | +0.72 | +0.60 | 93.1 | +0.39 | −2.51 | 3.94 | A | A | Inv. |
| 3C | C | — | 1.0 | 2.0 | 94.4 | −0.26 | −4.21 | 91.4 | −0.74 | −7.45 | 4.44 | B | A | Comp. |
| 3D | D | — | 1.0 | 2.0 | 93.9 | −0.90 | −7.80 | 90.9 | −1.28 | −10.5 | 4.05 | B | A | Comp. |
| 4A | A | — | 2.0 | 6.0 | 92.3 | +1.34 | +6.17 | 89.4 | +0.09 | −1.21 | 8.03 | A | C | Comp. |
| 4B | B | — | 2.0 | 6.0 | 95.5 | +0.72 | +0.60 | 92.5 | −0.33 | −6.14 | 7.45 | B | C | Comp. |
| 4C | C | — | 2.0 | 6.0 | 94.4 | −0.26 | −4.21 | 90.9 | −1.19 | −10.9 | 7.61 | B | C | Comp. |
| 4D | D | — | 2.0 | 6.0 | 93.9 | −0.90 | −7.80 | 89.0 | −1.73 | −16.5 | 10.02 | B | C | Comp. |

*1; White Background Tone
*2; White Background Variation
Comp.; Comparative Example
Inv.; Present Invention As can clearly be seen from Table 1, recording media which had a ΔabL value of the present invention of at most 7 and in which a* and b* of the ink absorbing layer surface were in the range of −2 to 2 and −4 to 4, respectively, exhibited excellent white background properties and minimal tone variation of the white background after extended storage at high temperature, and exhibited excellent tone stability, compared to comparative examples.

Example 2

<<Preparation of Ink-Jet Recording Sheet>

Recording Sheets 5A through 5D and 6A through 6D were prepared in the same manner as Recording Sheets 1A through 4D prepared in Example 1, except that instead of the yellow, magenta, and cyan dyes, Oil-soluble Dye M2 was added to Emulsified Dispersion 1 employed in the first layer through the third layer in an amount of 270 mg per liter of Emulsified Dispersion 1 and Y1 was added to the fourth layer in the amount described in Table 2.

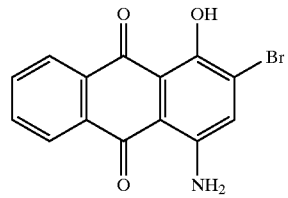

M2

<<Evaluation of Ink-jet Recording Sheet>>

Empolying the same methods described in Example 1, whiteness of the supports and ink absorbing layers was measured, and the tone of the white background as well as variation of the white background was evaluated. Table 2 shows the results.

TABLE 2

| Recording Sheet No. | Support No. | Coloring Dye (mg/m²) Y1 | Support Whiteness | | | Ink Absorptive Layer Whiteness | | | Each Evaluation Result | | Remarks |
|---|---|---|---|---|---|---|---|---|---|---|---|
| | | | L* | a* | b* | L* | a* | b* | ΔabL | *1 | *2 | |
| 5A | A | 5.0 | 92.3 | +1.34 | +6.17 | 89.8 | +1.82 | +9.22 | 3.97 | C | A | Comp. |
| 5B | B | 5.0 | 95.5 | +0.72 | +0.60 | 93.2 | +1.15 | +3.51 | 3.73 | A | A | Inv. |
| 5C | C | 5.0 | 94.4 | −0.26 | −4.21 | 92.5 | +0.30 | −1.33 | 3.50 | A | A | Inv. |
| 5D | D | 5.0 | 93.9 | −0.90 | −7.80 | 91.8 | −0.24 | −4.98 | 3.58 | B | A | Comp. |
| 6A | A | 15.0 | 92.3 | +1.34 | +6.17 | 89.3 | −0.25 | +12.8 | 7.45 | C | B | Comp. |
| 6B | B | 15.0 | 95.5 | +0.72 | +0.60 | 92.6 | −0.97 | +7.32 | 7.51 | C | B | Comp. |
| 6C | C | 15.0 | 94.4 | −0.26 | −4.21 | 91.6 | −1.33 | +2.25 | 7.12 | A | B | Comp. |
| 6D | D | 15.0 | 93.9 | −0.90 | −7.80 | 91.0 | −2.45 | −1.46 | 7.14 | B | B | Comp. |

*1; White Background Tone
*2; White Background Variation
Comp.; Comparative Example
Inv.; Present Invention As can clearly be seen from Table 2, Recording Sheets 5B and 5C, which were provided with white background characteristics specified in the present invention exhibited excel lent white background characteristics, and in addition, the white background variation during storage was minimal. Contrary to this, Recording Sheet 6C exhibited good white background, while it resulted in large white background variation during storage.

Example 3

Each of Recording Sheets 1B, 1C, 3A, 3B, 5B, and 5C was printed employing various types of commercially available ink-jet printers (PM9000C, manufactured by Epson Co., BJ-W-9000, manufactured by Canon Inc., and Design Jet, manufactured by Hewlett-Packard Co.), and these sheets produced desired printing images.

The present invention is capable of providing an ink-jet recording sheet in which the whiteness of the white background exhibits the preferred white tone and variation of whiteness of the white background is minimized during extended storage, even though a porous ink absorbing layer is provided, and further is capable of providing an ink-jet recording sheet which has a white background particularly suitable for printing sheets and printing proofs employed for ink-jet printing, and is subject to minimal discoloration of the white background during extended storage.

What is claimed is:

1. An ink-jet recording sheet comprising a reflective support having thereon a porous ink absorbing layer comprising a dye or a pigment, wherein the dye or the pigment is present in an amount of 0.01 to 200 mg per m$^2$ of the recording sheet; and a color difference ΔabL defined by the following formula is not more than 7:

$$\Delta abL = [(a_1-a_2)^2+(b_1-b_2)^2+(L_1-L_2)^2]^{1/2}$$

wherein $(L_1, a_1, b_1)$ and $(L_2, a_2, b_2)$ each are a set of coordinates $(L^*, a^*, b^*)$ defined in a CIELAB color space and measured on a surface of the reflective support adjacent to the ink absorbing layer and on an outermost surface of the ink absorbing layer respectively, and $a_2$ is in a range of −2 to 2 and $b_2$ is in a range of −4 to 4.

2. The ink-jet recording sheet of claim 1, wherein the outermost surface of the ink absorbing layer exhibits a 60 degree specular glossiness of 10 to 25% when measured using a method described in JIS-Z-8741.

3. The ink-jet recording sheet of claim 1, wherein the reflective support is a paper support coated with a polyolefin resin on both surfaces of the paper support.

4. The ink-jet recording sheet of claim 1, wherein the reflective support has a set of coordinates $(a_1, b_1)$ defined in a CIELAB $(a^*, b^*)$ space, $a_1$ being in a range of −4 to 4 and $b_1$ being in a range of −8 to 8.

5. The ink-jet recording sheet of claim 3, wherein a surface of the coated polyolefin resin adjacent to the ink absorbing layer is an embossed surface.

6. The ink-jet recording sheet of claim 5, wherein the reflective support has a surface roughness Ra of 0.6 to 6 to 5 μm.

7. The ink-jet recording sheet of claim 5, wherein the reflective support has a set of coordinates $(a_1, b_1)$ defined in a CIELAB $(a^*, b^*)$ space, $a_1$ being from −4 to 4 and $b_1$ being from −8 to 8, and the reflective support has a surface roughness Ra of 0.6 to 5 μm.

8. The ink-jet recording sheet of claim 1, wherein an amount of the dye or the pigment is in a range of 3 to 12 mg per m$^2$ of the recording sheet.

* * * * *